(12) United States Patent
Tabata et al.

(10) Patent No.: US 7,753,149 B2
(45) Date of Patent: Jul. 13, 2010

(54) VEHICLE DRIVING APPARATUS

(75) Inventors: Atsushi Tabata, Okazaki (JP); Yutaka Taga, Aichi-gun (JP); Terufumi Miyazaki, Toyota (JP); Ryuji Ibaraki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1002 days.

(21) Appl. No.: 11/265,228

(22) Filed: Nov. 3, 2005

(65) Prior Publication Data

US 2006/0108162 A1 May 25, 2006

(30) Foreign Application Priority Data

Nov. 22, 2004 (JP) .............................. 2004-337168
Nov. 22, 2004 (JP) .............................. 2004-338167

(51) Int. Cl.
*B60K 6/46* (2007.10)

(52) U.S. Cl. .............................. 180/65.245; 180/65.225

(58) Field of Classification Search ................ 180/65.1, 180/65.2, 65.3, 65.4, 65.6, 65.21, 65.22, 180/65.245; 903/902, 924, 925
See application file for complete search history.

(56) References Cited

U.S. PATENT DOCUMENTS

| | | | | |
|---|---|---|---|---|
| 3,904,883 | A * | 9/1975 | Horwinski | 290/50 |
| 5,773,904 | A * | 6/1998 | Schiebold et al. | 310/92 |
| 6,155,364 | A * | 12/2000 | Nagano et al. | 180/65.2 |
| 6,317,665 | B1 * | 11/2001 | Tabata et al. | 701/22 |
| 2002/0060099 | A1 * | 5/2002 | Takenaka et al. | 180/65.1 |
| 2003/0102174 | A1 * | 6/2003 | Bordini | 180/65.2 |
| 2003/0127262 | A1 * | 7/2003 | Noreikat et al. | 180/65.2 |
| 2004/0145259 | A1 * | 7/2004 | Wysk et al. | 310/89 |
| 2005/0038577 | A1 * | 2/2005 | Dreibholz et al. | 701/22 |

FOREIGN PATENT DOCUMENTS

| | | |
|---|---|---|
| DE | 697 32 387 T2 | 1/2006 |
| JP | 05-042833 A | 2/1993 |
| JP | 08-317600 A | 11/1996 |
| JP | A 9-71138 | 3/1997 |
| JP | A 9-109705 | 4/1997 |
| JP | A 11-98615 | 4/1999 |
| JP | A 2001-113970 | 4/2001 |
| JP | A 2001-138752 | 5/2001 |
| JP | 2002-523275 A | 7/2002 |
| JP | 2003-061301 A | 2/2003 |
| JP | A 2003-191759 | 7/2003 |
| JP | 2004-204995 A | 7/2004 |
| JP | 2006-089000 A | 4/2006 |
| JP | 09-226392 A | 9/2007 |
| WO | WO02/26513 A1 | 4/2002 |

OTHER PUBLICATIONS

German Language Version of German Office Action, Appln. 10 2005 055 424.5-14, issued Mar. 9, 2007.
English Translation of German Office Action, Appln. 10 2005 055 424.5-14, issued Mar. 9, 2007.

* cited by examiner

*Primary Examiner*—Paul N Dickson
*Assistant Examiner*—John R Olszewski
(74) *Attorney, Agent, or Firm*—Kenyon & Kenyon LLP

(57) ABSTRACT

A rotor shaft of a first electric motor is connected to a crankshaft of the engine by being fit to a transmitting member that is coupled to the crankshaft. The stator and rotor shaft of the first electric motor are supported by a case housing the first electric motor.

23 Claims, 6 Drawing Sheets

FIG.3

|      | C1 | C2 | C3 | C4 | B1 | B2 | TRANSMISSION GEAR RATIO |
|------|----|----|----|----|----|----|--------------------------|
| P    |    |    |    |    |    |    |                          |
| Rev1 |    |    | O  |    |    | O  | 4.022                    |
| Rev2 |    |    |    | O  |    | O  | 2.158                    |
| N    |    |    |    |    |    |    |                          |
| 1st  | O  |    |    |    |    | O  | 4.495                    |
| 2nd  | O  |    |    |    | O  |    | 2.697                    |
| 3rd  | O  |    | O  |    |    |    | 1.864                    |
| 4th  | O  |    |    | O  |    |    | 1.471                    |
| 5th  | O  | O  |    |    |    |    | 1.238                    |
| 6th  |    | O  |    | O  |    |    | 1.000                    |
| 7th  |    | O  | O  |    |    |    | 0.823                    |
| 8th  |    | O  |    |    | O  |    | 0.683                    |

($\rho 1=0.463$  $\rho 2=0.463$  $\rho 3=0.415$)

VEHICLE DRIVING APPARATUS

INCORPORATION BY REFERENCE

The disclosure of Japanese Patent Applications No. 2004-337168 and No. 2004-338167 both filed on Nov. 22, 2004 including the specification, drawings and abstracts is incorporated herein by reference in their entireties.

BACKGROUND OF THE INVENTION

1. Field of the Invention

The invention relates to a vehicle driving apparatus used for vehicles such as automobiles and so forth.

2. Description of the Related Art

As a driving source for a vehicle, vehicle driving apparatuses including an engine and an electric motor are known. For example, such a vehicle driving apparatus is disclosed in U.S. patent application Publication No. 2003/0127262 A1. The vehicle driving apparatus disclosed in this publication includes an engine and first and second electric motors. A flange of a rotor of the first electric motor is directly connected to a crankshaft of the engine with bolts. Furthermore, a damper is disposed on the opposite side of the engine with respect to the flange of the rotor. Moreover, a clutch and the second electric motor are disposed on the opposite side of the engine with respect to the damper. Thus, the engine, the first electric motor, the damper, the clutch, and the second electric motor, form a single unit.

When assembling the thus configured vehicle drive apparatus, the rotor is directly mounted to the crankshaft of the engine before covering the rotor with a housing, a cover, or the like. This may lead to a problem that foreign matter such as iron powder and so forth adheres to a magnetized portion of the rotor, for example. Furthermore, the rotor is connected to the crankshaft of the engine, and thus the position of the rotor is fixed. On the other hand, a stator is fixed on the housing, and thus the position thereof is fixed. Such a configuration leads to a positional error between a rotor axis and a stator axis due to a positional error of the crankshaft of the engine and the housing. In some cases, this leads to difficulty in aligning the rotor axis with the stator axis with high precision.

To counter this, for example, the rotor of the first electric motor may possibly be supported by a support wall fixed on the housing. Adding such a support wall, however, may result in a greater axial length of the vehicle driving apparatus, which is not desirable.

SUMMARY OF THE INVENTION

In view of the aforementioned situation, it is an object the invention to provide a vehicle driving apparatus which can be assembled with a high precision in aligning a rotor axis and a stator axis while preventing foreign matter from adhering to a magnetized portion of an electric motor.

Also, it is another object of the invention to realize a small axial length of a vehicle driving apparatus including a first and second electric motors.

A first aspect of the invention relates to a vehicle driving apparatus, including an engine having a drive connection with a wheel of a vehicle, an electric motor having a drive connection with the wheel of the vehicle, and a transmitting member which is connected to a crankshaft of the engine so as to be rotated together therewith. The electric motor is arranged at an end of the transmitting member on the side opposite where the engine is located. The stator and rotor shaft of the electric motor are supported by a case, and the rotor shaft supporting the rotor and the transmitting member are connected to each other by being fit to each other.

According to this structure, the rotor of the electric motor is supported by the case, not the crankshaft, and the rotor shaft can be connected to the crankshaft by being fit to the transmitting member coupled to the crankshaft so as to rotate together therewith. Thus, it is possible to connect the rotor of the electric motor to the engine side after installing the rotor into the case, which prevents foreign matter from adhering to the magnetized portion of the rotor. Furthermore, both the rotor and the stator are supported by the case, whereby the axes of the rotor and the stator can be aligned with high precision.

A second aspect of the invention relates to a vehicle driving apparatus including a first electric motor, a second electric motor, a case that houses the first electric motor and the second electric motor, a first support wall that is supported by the case and rotatably supports the end of a rotor shaft of the first electric motor on the side opposite where the second electric motor is located, and a second support wall which is arranged between the first electric motor and the second electric motor, is supported by the case, rotatably supports the end of the rotor shaft of the first electric motor on the side where the second electric motor is located, and rotatably supports at least one end of a rotor shaft of the second electric motor.

According to this structure, one end of the rotor shaft of the first electric motor and at least one end of the rotor shaft of the second electric motor are supported by the second support wall. This reduces the number of support walls and thus the axial length of the vehicle driving apparatus.

A third aspect of the invention relates to a vehicle driving apparatus including an engine having a drive connection with a wheel of a vehicle, a first electric motor having a drive connection with the wheel of the vehicle and including a stator, rotor, and rotor shaft supporting said rotor, and a case that partially, or entirely, houses the first electric motor. The first electric motor is connected to the engine via a transmitting member that rotates together with an output shaft of the engine. The rotor shaft of the first electric motor and the output shaft of the engine are arranged along a predetermined axis. The rotor shaft of the first electric motor and the transmitting member are fit to each other for a connection therebetween. The stator and the rotor shaft of the first electric motor are directly, or indirectly, supported by the case.

BRIEF DESCRIPTION OF THE DRAWINGS

The foregoing and/or further objects, features and advantages of the invention will become more apparent from the following description of exemplary embodiment with reference to the accompanying drawings, in which like numerals are used to represent like elements and wherein:

FIG. 3 is an operation table showing the relation between the speeds which can be achieved by the automatic transmission shown in FIG. 1 and combinations of the applied/released states of hydraulic friction engaging devices for achieving the speeds;

DETAILED DESCRIPTION OF THE EXEMPLARY EMBODIMENTS

Figure 1:
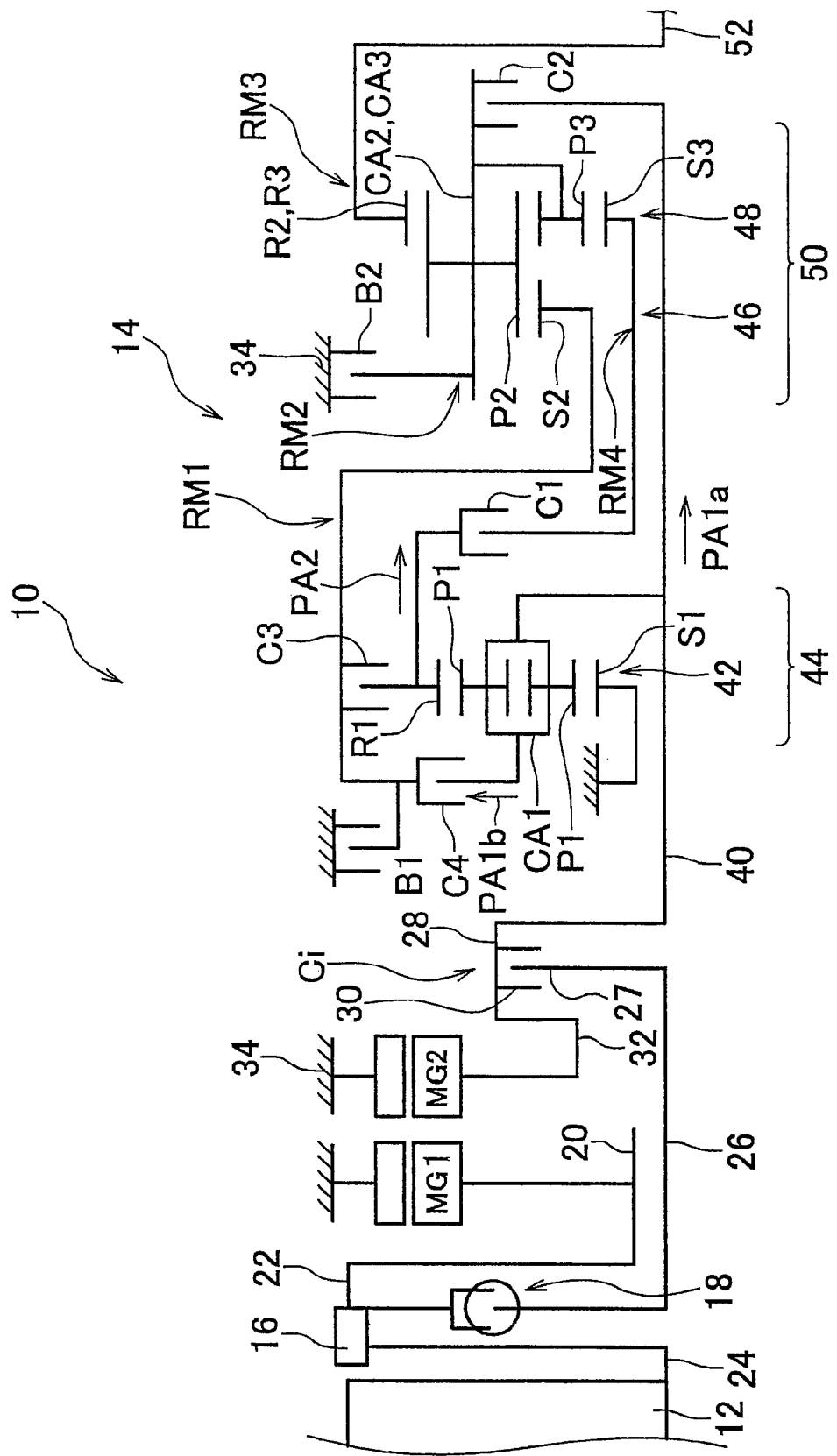
FIG. 1 is a schematic diagram showing a configuration of a vehicle driving apparatus to which the invention is applied.

Next, exemplary embodiments of the invention will be described with reference to the drawings. FIG. 1 is a schematic diagram showing the configuration of a vehicle driving apparatus (which will be referred to as "driving apparatus" hereafter) 10 according to one exemplary embodiment of the invention. The driving apparatus 10 can be suitably employed in FR vehicles by being mounted in the longitudinal direction thereof. Specifically, the driving apparatus 10 includes an engine 12, a first electric motor-generator MG1, a second electric motor-generator MG2, and an automatic multi-speed transmission (which will be simply referred to as "automatic transmission" hereafter) 14, in that order in the axial direction. A flywheel 16 and a damper 18, which serve as vibration damping devices, are provided between the first electric motor-generator MG1 and the engine 12. A rotor shaft 20 of the first motor-generator MG1 is connected to a crankshaft 24 of the engine 12 through the flywheel 16 and a transmitting member 22. A direct clutch Ci is provided between the second electric motor-generator MG2 and the automatic transmission 14. A first input shaft 26 is connected to the crankshaft 24 of the engine 12 through the flywheel 16 and the damper 18. Driving force of the engine 12 and the first electric motor-generator MG1 is input to the first input shaft 26. The driving apparatus 10 is symmetric about the longitudinal axis thereof, and therefore the portion below the axis is omitted in FIG. 1.

The first electric motor-generator MG1 is directly connected to the crankshaft 24 of the engine 12 without a belt or the like. Therefore, the crankshaft 24 is directly rotated by the rotor shaft 20 of the electric motor-generator MG1, which enables the engine to start easily even at low temperature where cranking the engine typically requires great driving force.

The direct clutch Ci is a multiple disc hydraulic friction apply device that is frictionally engaged by means of a hydraulic cylinder. The direct clutch Ci includes a friction disc 27 that is rotated together with the first input shaft 26 which is a driving shaft, and friction discs 30 that are rotated together with a clutch drum 28 which is a rotating member to be driven by external force. The clutch drum 28 is connected to a rotor shaft 32 of the second electric motor-generator MG2 and the input shaft of the automatic transmission 14, i.e., a second input shaft 40. The direct clutch Ci selectively connects or disconnects the engine 12 and the first electric motor-generator MG1 to or from the electric motor-generator MG2 and the automatic transmission 14. In this way, the direct clutch Ci serves as an input clutch for inputting the driving force of the engine 12 and the first electric motor-generator MG1 to the automatic transmission 14.

The automatic transmission 14 has a first transmission portion 44 including a first planetary gear 42 as a main component, and a second transmission portion 50 including a second planetary gear 46 and a third planetary gear 48 as main components.

The planetary gear 42 is a double-pinion type planetary gear, which includes a sun gear S1, a plurality of pairs of pinions P1 meshing with each other, a carrier CA1 supporting the pinions P1 so as to allow rotation on their own axes and revolution around the sun gear S1, and a ring gear R1 meshing with the sun gear S1 through the pinions P1. The carrier CA1 is connected to and rotationally driven by the second input shaft 40. The sun gear S1 is integrally and non-rotatably fixed to a case 34 which is a non-rotatable member. The ring gear R1 serves as an intermediate output member. Specifically, the ring gear R1 slows the speed of the second input shaft 40, and transmits it to the second transmission portion 50. There is a first intermediate output path PA1 which transmits the rotation of the second input shaft 40 to the second transmission 50 without changing the rotation speed of the second input shaft 40. Thus, the first intermediate output path PA1 transmits the rotation at a predetermined transmission gear ratio (=1.0). The first intermediate output path PA1 includes a direct path PA1$a$ that transmits the rotation of the second input shaft 40 to the second transmission portion 50 without involving the first planetary gear 42, and an indirect path PA1$b$ that transmits the rotation of the second input shaft 40 to the second transmission portion 50 through the carrier CA1 of the first planetary gear 42. There is also a second intermediate output path PA2 which transmits rotation from the input shaft 40 to the second transmission portion 50 via the carrier CA1, the pinions P1 arranged on the carrier CA1, and the ring gear R1. This path slows the rotation input from the input shaft 40 and transmits it at a larger speed ratio (>1.0) than does the first intermediate output path PA1.

The second planetary gear 46 is a single pinion type planetary gear set which includes a sun gear S2, a pinion P2, a carrier CA2 which rotatably and revolvably supports that pinion P2, and a ring gear R2 which is in mesh with the sun gear S2 via the pinion P2. The third planetary gear 48 is a double pinion type planetary gear set and includes a sun gear S3, a plurality of pairs of pinions P2 and P3 which are in mesh with each other, a carrier CA3 which rotatably and revolvably supports those pinions P2 and P3, and a ring gear R3 which is in mesh with the sun gear S3 via the pinions P2 and P3.

In the second planetary gear 46 and the third planetary gear 48, four rotating elements RM1, RM2, RM3, and RM4 are formed by common use of the carriers CA2 and CA3 which rotatably support the pinion P2, and the ring gears R2 and R3. That is, the sun gear S2 of the second planetary gear 46 serves as the first rotating element RM1, the carrier CA2 of the second planetary gear 46 and the carrier CA3 of the third planetary gear 48 are integrally connected together and serve as the second rotating element RM2, the ring gear R2 of the second planetary gear set 46 and the ring gear R3 of the third planetary gear 48 are integrally connected together and serve as the third rotating element RM3, and the sun gear S3 of the third planetary gear 48 serves as the fourth rotating element RM4.

The first rotating element RM1 (i.e., the sun gear S2) is selectively held to the transmission case 14 by a first brake B1, which prevents it from rotating. The first rotating element RM1 (i.e., the sun gear S2) is also selectively connected to the ring gear R1 of the first planetary gear 42, i.e., the intermediate output member, via a third clutch C3 (i.e., the second intermediate output path PA2). The first rotating element RM1 (i.e., the sun gear S2) is further selectively connected to the carrier CA1 of the first planetary gear 42 via a fourth clutch C4 (i.e., the indirect path PA1$b$ of the first intermediate output path PA1). The second rotating element RM2 (i.e., the carriers CA2 and CA3) is selectively held to the transmission case 34 by a second brake B2, which prevents it from rotating, and is also selectively connected to the input shaft 40 via a second clutch C2 (i.e., the direct path PA1$a$ of the intermediate output path PA1). The third rotating element RM3 (i.e., the ring gears R2 and R3) is integrally connected to an output shaft 52 of the automatic transmission 16 and outputs rotation. The fourth rotating element RM4 (i.e., the sun gear S3) is connected to the ring gear R1 via a first clutch C1. The brakes B1 and B2 and the clutches C1 to C4 are all multiple disc hydraulic friction apply devices that are frictionally engaged by means of a hydraulic cylinder.

Figure 2:
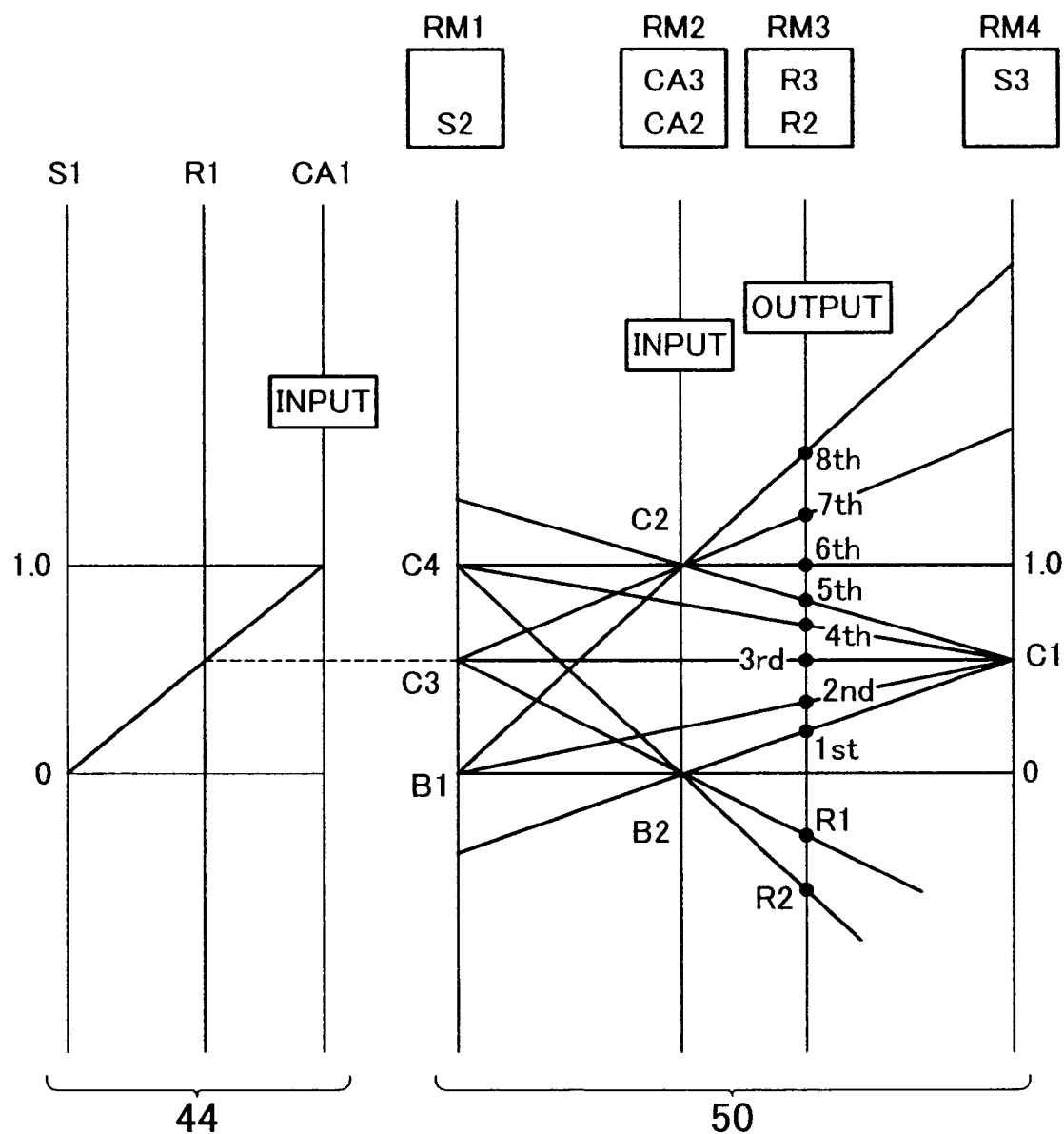
FIG. 2 is an alignment graph for describing the operation of the automatic transmission shown in FIG. 1.

FIG. 2 is an alignment graph that is able to illustrate, with straight lines, the rotation speed of each rotating element of the first transmitting portion 44 and the second transmitting portion 50. The lower horizontal line represents a rotation speed of "0" while the upper horizontal line represents a rotation speed of "1.0", i.e., a rotation speed equal to that of the second input shaft 40. Also, the vertical lines on the first transmission portion 44 side represent, in order from left to right, the sun gear S1, the ring gear R1, and the carrier CA1. The distances between those vertical lines are set according to the gear ratio $\rho 1$ (=the number of teeth on the sun gear S1/the number of teeth on the ring gear R1) of the first planetary gear 42. In FIG. 2, the speed ratio $\rho 1$ equals 0.463, for example. The four vertical lines on the second transmission portion 50 side represent, in order from left to right, the first rotating element RM1 (i.e., the sun gear S2), the second rotating element RM2 (i.e., the carrier CA2 and the carrier CA3), the third rotating element RM3 (i.e., the ring gear R2 and the ring gear R3), and the fourth rotating element RM4 (i.e., the sun gear S3). The distances between those vertical lines are set according to the speed ratio $\rho 2$ of the second planetary gear 46 and the speed ratio $\rho 3$ of the third planetary gear 48. In FIG. 2, $\rho 2$ equals 0.463 and $\rho 3$ equals 0.415, for example.

As can be seen from the alignment graph, eight forward speeds, i.e., a first forward speed "1st" through an eighth forward speed "8th", and two reverse speeds, i.e., a first reverse speed "Rev1" and a second reverse speed "Rev2" can be established depending on the operative state (applied or released) of the clutches C1 to C4 and the brakes B1 and B2.

FIG. 3 is a clutch and brake application chart showing the relationship between the apply devices when each speed is established and the speed ratio of each speed. In the drawing, a circle indicates an applied state and the absence of a circle indicates a released state. The speed ratio of each speed is set appropriately by the speed ratio $\rho 1$ of the first planetary gear set 42, the speed ratio $\rho 2$ of the second planetary gear set 46, and the speed ratio $\rho 3$ of the third planetary gear set 48. If $\rho 1=0.463$, $\rho 2=0.463$, and $\rho 3=0.415$ as shown in FIG. 3, then the value of the speed ratio steps (i.e., the ratio of the speed ratios between the speeds) is generally appropriate, and the total speed ratio range (=4.495/0.683) is large, around 6.581. Further, the speed ratios of the reverse speeds "Rev1" and "Rev2" are also suitable. As a result, appropriate overall speed ratio characteristics are able to be obtained. As shown in FIG. 3, the automatic transmission 16 is able to realize a large speed ratio range with appropriate speed ratio steps. Furthermore, speeds can be shifted by simply changing the operative state of any two of the four clutches C1 to C4 and the two brakes B1 and B2. As a result, shift control is simplified and shift shock is able to be suppressed.

Figure 4:
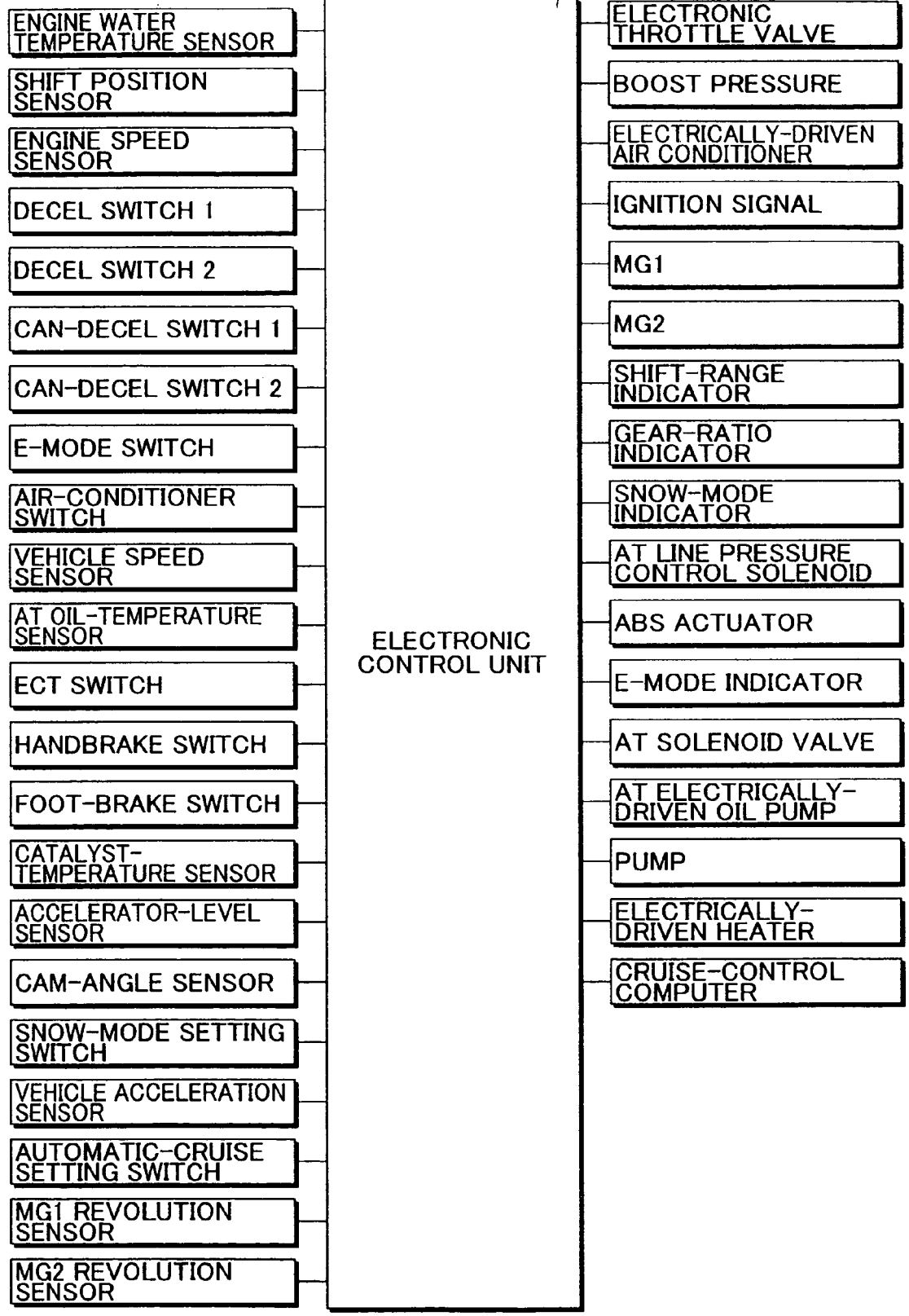
FIG. 4 is a diagram which shows examples of signals which are input to or output from an electronic controller for controlling the driving apparatus shown in FIG. 1.

FIG. 4 is a view illustrating signals both input to and output from an electronic control unit (ECU) 60 for controlling the drive system 10 according to this exemplary embodiment. The ECU 60 includes a so-called microcomputer that includes a CPU, ROM, RAM, and an input/output interface and the like. The ECU 60 runs the vehicle in a plurality of operating modes in which the engine 12 and the motor-generators MG1 and MG2 are in different operating states, by executing output control of the engine 12, shift control of the automatic transmission 16, and powering/regenerating control of the motor-generators MG1 and MG2, and the like by performing signal processing according to a program stored beforehand in the ROM while using the temporary storage function of the RAM.

Various signals output from the various sensors and switches shown in FIG. 4 are input to the ECU 60. Examples of these signals include a signal indicative of the engine coolant temperature, a signal indicative of the shift lever position, a signal indicative of the engine speed NE, i.e., the rotation speed of the engine 12, Decel1 and Decel2 signals indicative of target values of vehicle deceleration by powering/regenerating control of the engine brake and the motor-generators MG1 and MG2, i.e., signals directing an increase in the target deceleration, Can-Decel1 and Can-Decel2 signals directing a decrease in the target deceleration, a signal directing a deceleration control mode (i.e., E-mode) for controlling the target deceleration, an air conditioner signal indicative of operation of an air conditioner, a vehicle speed signal which corresponds to the rotation speed of the output shaft 52, an AT fluid temperature signal indicative of the temperature of hydraulic fluid in the automatic transmission 16, a signal indicative of an emergency brake operation, and a signal indicative of a foot brake operation. Other examples of signals input to the ECU 60 include a catalyst temperature signal indicative of the temperature of a catalyst, an accelerator opening amount signal indicative of the operating amount of an accelerator pedal, a cam angle signal, a snow mode setting signal indicative of a snow mode setting, an acceleration signal indicative of forward/backward acceleration of the vehicle, an auto cruise signal indicative of auto cruise running, a signal indicative of a rotation speed NMG1 of the first motor-generator MG1, and a signal indicative of a rotation speed NMG2 of the second motor-generator MG2.

In addition, various signals are also output from the ECU 60. Examples of these signals include a drive signal to a throttle actuator which controls the opening amount of a throttle valve, a boost pressure adjust signal for adjusting boost pressure, an electric air conditioner drive signal for operating an electric air conditioner, an ignition signal which directs the ignition timing of the engine 12, a command signal which directs operation of the motor-generators MG1 and MG2, a shift lever position (i.e., operating position) indication signal for operating a shift indicator, a speed ratio indication signal for indicating the speed ratio, a snow mode indication signal for indicating when the snow mode is set, an ABS activation signal for activating an ABS actuator which prevents the wheels of the vehicle from slipping during braking, an E-mode indication signal which indicates that the E-mode is selected, a valve command signal which activates an electromagnetic valve in the hydraulic pressure control circuit for controlling a hydraulic pressure actuator of hydraulic friction engagement devices provided in the transmission 16 and the lock-up clutch Ci, a drive command signal for activating an electric oil pump which is the source of hydraulic pressure in the hydraulic pressure control circuit, a signal driveably connected to an electric heater, and a signal to a cruise control computer.

The plurality of operating modes which are controlled by the ECU 60 includes an engine running mode, an engine plus motor running mode, a motor running mode, and a deceleration control mode. In the engine running mode, the lock-up clutch Ci is applied to connect the engine 12, and the vehicle is run by driving force generated by the engine 12. When not all of the power generated by the engine 12 is being used to drive the vehicle, for example, the first electric motor MG1 can be controlled to regenerate that power as necessary and use it to charge the battery. In the engine plus motor running mode, the lock-up clutch Ci is applied to connect the engine 12, and the vehicle is run by the driving force generated by both the engine 12 and the second electric motor MG2. In the motor running mode, the lock-up clutch Ci is released to disconnect the engine 12, and the vehicle is run by the driving force generated by the second electric motor MG2. When the state-of-charge SOC of the battery is low, for example, the engine 12 is operated as necessary and the first electric motor MG1 is controlled to regenerate power and charge the battery. In the deceleration control mode, the lock-up clutch Ci is applied to connect the engine 12 and the supply of fuel to the engine 12 is stopped by a fuel cut to induce engine braking, while the second electric motor MG2 is controlled to either produce or regenerate power, thereby generating a predetermined power source brake. The first electric motor MG1 can also be used to adjust the power source brake by also being controlled to either produce or regenerate power, just like the second electric motor MG2.

Figure 5:
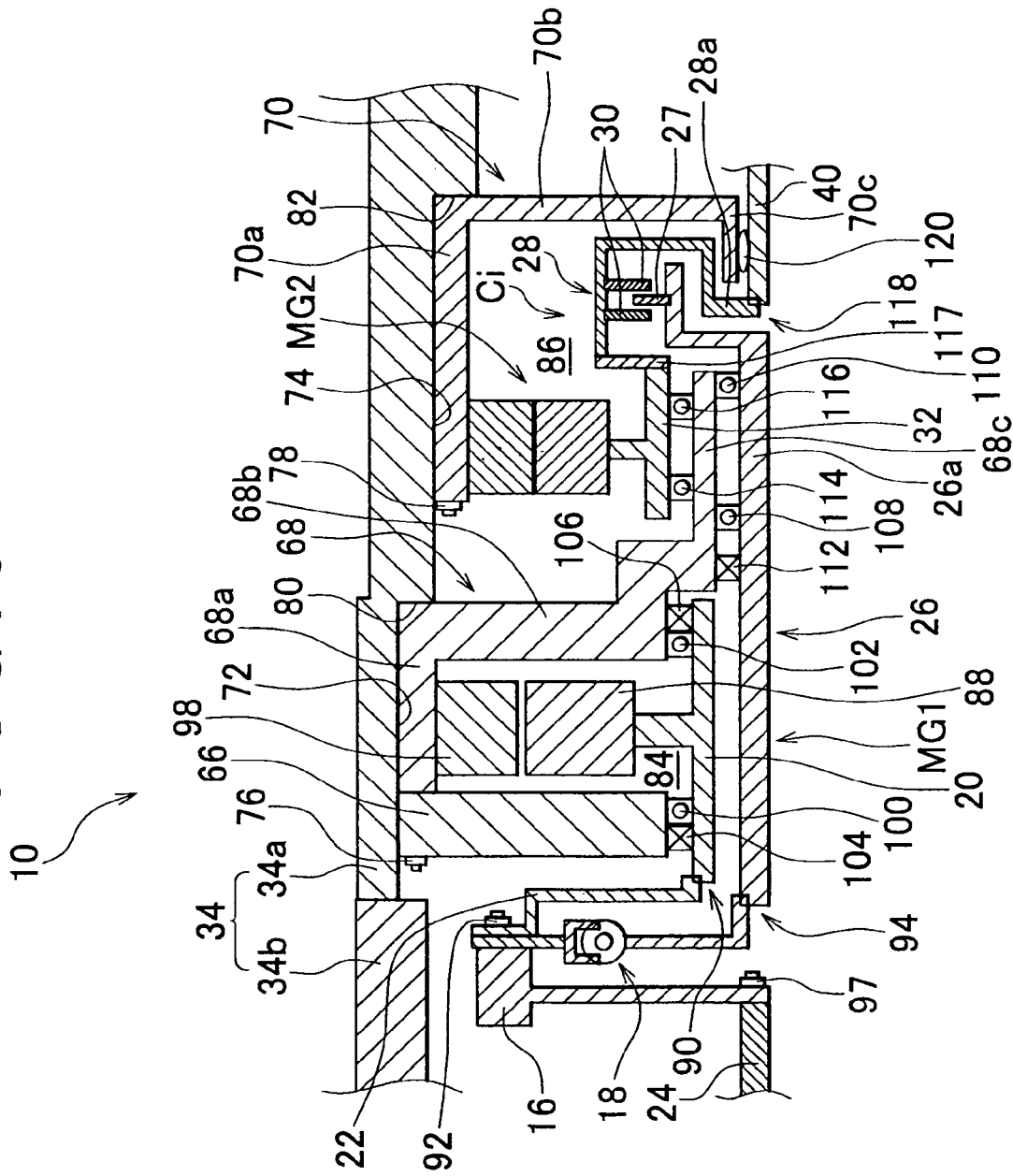
FIG. 5 is a cross-sectional view which schematically shows the configuration of the driving apparatus shown in FIG. 1.

FIG. 5 is a simplified sectional view of a structure of the drive system 10. As shown in FIG. 5, the transmission case 34 has a first case 34a and a second case 34b which are joined together with a bolt, not shown. The first case 34a houses the first motor-generator MG1 and the second motor-generator MG2 and the like, while the second case 34b houses the flywheel 16, the transmitting member 22, and the damper 18 and the like. The second case 34b is integrated with the engine 12.

The first case 34a houses a first support wall 66, a second support wall 68, and an oil pump 70 that also serves as a third support wall, in that order from the side of the opening of the first case 34a (the engine 12 side) to the rear side. Furthermore, the first case 34a houses the automatic transmission 14 not shown in FIG. 5, which is arranged farther to the rear side than the oil pump 70. The first and second support walls 66 and 68 and the oil pump 70 form a bell and spigot configuration with respect to the first case 34a. More specifically, the outer surface of each of the first and second support walls 66 and 68 is disposed so as to abut against a first abutting surface 72 which is a portion of an inner peripheral surface of the first case 34a and is parallel with the axial direction, and the outer surface of the oil pump 70 is disposed so as to abut against a second abutting surface 74 which is another portion of the inner peripheral surface of the first case 34a located farther to the rear side than the first abutting surface 72 and is parallel with the axial direction. The inner diameter of the second abutting surface 74 is smaller than the first abutting surface 72. The support walls 66, 68 and the oil pump 70 are slidable along the first case 34a when they are not fixed with bolts 76 and 78. In this way, the first and second support walls 66, 68 and the oil pump 70 provide a bell and spigot configuration with respect to the first case 34a, whereby their relative positions in the radial direction with respect to the first case 34a can be determined with high precision.

The first support wall 66 is a generally disk-shaped member. The second support wall 68 includes: an outer cylinder portion 68a that abuts against the first abutting surface 72; a connection portion 68b which is connected to the second electric motor-generator MG2 side end of the outer cylinder portion 68a and which extends inward in the radial direction; and a shaft portion 68c of which one end is connected to the radially inner end of the connection portion 68b and which extends in the direction opposite the outer cylinder portion 68a. The oil pump 70 supplies oil to the direct clutch Ci, the automatic transmission 14, and so forth. The oil pump 70 includes: an outer cylinder portion 70a that abuts against the second abutting surface 74; a connection portion 70b which is connected to the end of the outer cylinder portion 70a on the side opposite where the first electric motor-generator MG1 is located, and which extends inward in the radial direction; and a shaft portion 70c of which one end is connected to the radially inner end of the connection portion 70b and which extends in the same direction as does the outer cylinder portion 70a.

Furthermore, the first case 34a has: a first radial surface 80 which is formed in the radial direction and which connects the first abutting surface 72 and the second abutting surface 74; and a second radial surface 82 which extends from the other end of the second abutting surface 74 to the radially inner side. The second support wall 68 is arranged so as to abut against the first radial surface 80, whereby the position of the second support wall 68 in the axial direction. Similarly, the oil pump 70 is arranged so as to abut against the second radial surface 82, whereby the position of the oil pump 70 id determined in the axial direction. The first support wall 66 is arranged so as to abut against the side surface of the second support wall 68 which is opposite the side surface at which the second support wall 68 abuts against the first radial surface 80, whereby the position of the first support wall 66 is determined in the axial direction. The bolts 76 are screwed into the first case 34a in the axial direction through the first support wall 66 and the outer cylinder portion 68a of the second support wall 68, thereby fixing the first support wall 66 and the second support wall 68 to the first case 34a. On the other hand, the bolts 78 are screwed into the first case 34a through the outer cylinder portion 70a of the oil pump 70 in the axial direction, thereby fixing the oil pump 70 to the first case 34a.

The first support wall 66 and second support wall 68 define a first chamber 84 while the second support wall 68, the oil pump 70, and the first case 34a define a second chamber 86. The first chamber 84 houses the first electric motor-generator MG1 while the second chamber 86 houses the direct clutch Ci and the second electric motor-generator MG2. In the second chamber 86, the direct clutch Ci is located in the oil pump 70 side and the second electric motor-generator MG2 in the second support wall 68 side.

The rotor shaft 20 of the first electric motor-generator MG1 is not in contact with the first input shaft 26 extending through the inside the rotor shaft 20. The rotational driving force of a rotor 88 of the first electric motor-generator MG1 is input from the rotor shaft 20 to the first input shaft 26 through the transmitting member 22 and the damper 18. The transmitting member 22 is fit to the engine 12 side end of the rotor shaft 20 with a spline 90, and the damper 18 is integrated with the transmitting member 22 by bolts 92 and fit to the first input shaft 26 with a spline 94.

The transmitting member 22 and the damper 18 are fixed at the periphery to the flywheel 16 using the bolts 92 and the flywheel 16 is fixed to the crankshaft 24 using a bolt 97. The transmitting member 22, the damper 18, and the flywheel 16 are housed in the second case 34b while the rotor shaft 20 and the first input shaft 26, which are fit to the transmitting member 22 and the damper 18, respectively, are housed in the first case 34a. The transmitting member 22 and the rotor shaft 20 are fit by spline 90 to each other and the damper 18 and the first input shaft 26 by spline 94. This structure enables the first case 34a and the second case 34b to be easily jointed together during assembly.

The rotor shaft 20 is supported at one end by the first support wall 66 via a bearing 100 provided on the inner surface of the first support wall 66, and at the other end by the second support wall 68 via a bearing 102 provided on the inner surface of the connection portion 68b of the second support wall 68. Supporting the rotor shaft 20 by the first support wall 66 and the second support wall 68 in this way makes the first chamber 84 a closed space. Thus, once the rotor shaft 20 is assembled, foreign matter is prevented from adhering to the rotor 88 housed within the first chamber 84 even before the first case 34a and the second case 34b are jointed together. Furthermore, the positions, in the radial direction, of the first support wall 66 and the second support wall 68 which support the rotor shaft 20 at both ends are determined by the first support wall 66 and the second support wall 68 abutting against the first abutting surface 72 of the first case 14a. That is, the positions, in the radial direction, of the first support wall 66 and the second support wall 68 are determined with reference to the same surface of the same member. Therefore, the axial precision of the rotor shaft 20 that is supported by the first support wall 66 and the second support wall 68 is improved compared with a case in which the positions, in the radial direction, of the first support wall 66 and the second support wall 68 are determined with reference to different members.

A stator 98 of the first electric motor-generator MG1 is fit onto the inner surface of the outer cylinder portion 68a of the second support wall 68. That is, the stator 98 is supported by the first case 34b via the second support wall 68. Thus, the position, in the radial direction, of the stator 98 is determined with reference to the first abutting surface 72 of the first case 34b. The rotor shaft 20 and the rotor 88 supported by the rotor shaft 20 are supported by the first case 34b via the first support wall 66 and the second support wall 68. Therefore, the position, in the radial direction, of the rotor 88 is determined with reference to the first abutting surface 72 as is the stator 98. Accordingly, the axes of the rotor 88 and the stator 98 are aligned with high precision.

Moreover, seal members 104 and 106 are provided adjacent to, but on opposite sides of, the bearings 100 and 102, between the inner peripheral surface of the first support wall 66 and the rotor shaft 20, and between the inner peripheral surface of the connecting portion 68b of the second support wall 68 and the rotor shaft 20, respectively. These seal members 104 and 106 seal off the first chamber 84. In FIG. 5, the bearing 100 and the seal member 104 are separate members, as are the bearing 102 and the seal member 106. Alternatively, however, the bearing 100 and the seal member 104 may be integrated together, and the bearing 102 and the seal member 106 may be similar.

The first input shaft 26 extends through the rotor shaft 20 and the shaft portion 68c of the second support wall 68. This first input shaft 26 is supported by the second support wall 68 at two positions, i.e., via a pair of bearings 108 and 110, one of which is provided near one side, in the axial direction, of the shaft portion 68c of the second support wall 68 and the other of which is provided near the other side, in the axial direction, of the shaft portion 68c of the second support wall 68. Furthermore, a seal member 112 is provided between the input shaft 22b and the shaft portion 68c of the second support wall 68 toward the engine 12 side of the bearing 108 which is the bearing, from among the pair of bearings 108 and 110, that is on the engine 12 side. The seal member 112 seals off the second support wall 86 side of the second chamber 86 from the space on the engine 12 side of the second support wall 68.

In this way, the first chamber 84 and the second chamber 86 are sealed spaces so even if water enters between the first case 14a and the second case 14b, the first motor-generator MG1 and the second motor-generator MG2, which are electrical components, will not get wet.

The rotor shaft 32 of the second motor-generator MG2 is supported at both ends by the shaft portion 68c of the second support wall 68 via a pair of bearings 114 and 116 which are arranged between the outer peripheral surface of that shaft portion 68c and the inner peripheral surface of the rotor shaft 32. In this way, the second support wall 68 supports both the first input shaft 26 and one end portion of the rotor shaft 22 of the first motor-generator MG1, which reduces the number of support walls compared to a case in which support walls are provided separately to support these shafts 32, 20, and 26.

The clutch drum 28 is fixed to one end of the rotor shaft 32 through a connection member 117. The inner peripheral end of a flange portion 28a of the clutch drum 28 is fitted by a spline 118 to the second input shaft 40. A needle bearing 120 is provided on the external peripheral surface of the second input shaft 40, and the second input shaft 40 is supported by a shaft portion 70c of the oil pump 70 via the needle bearing 120.

Figure 6:
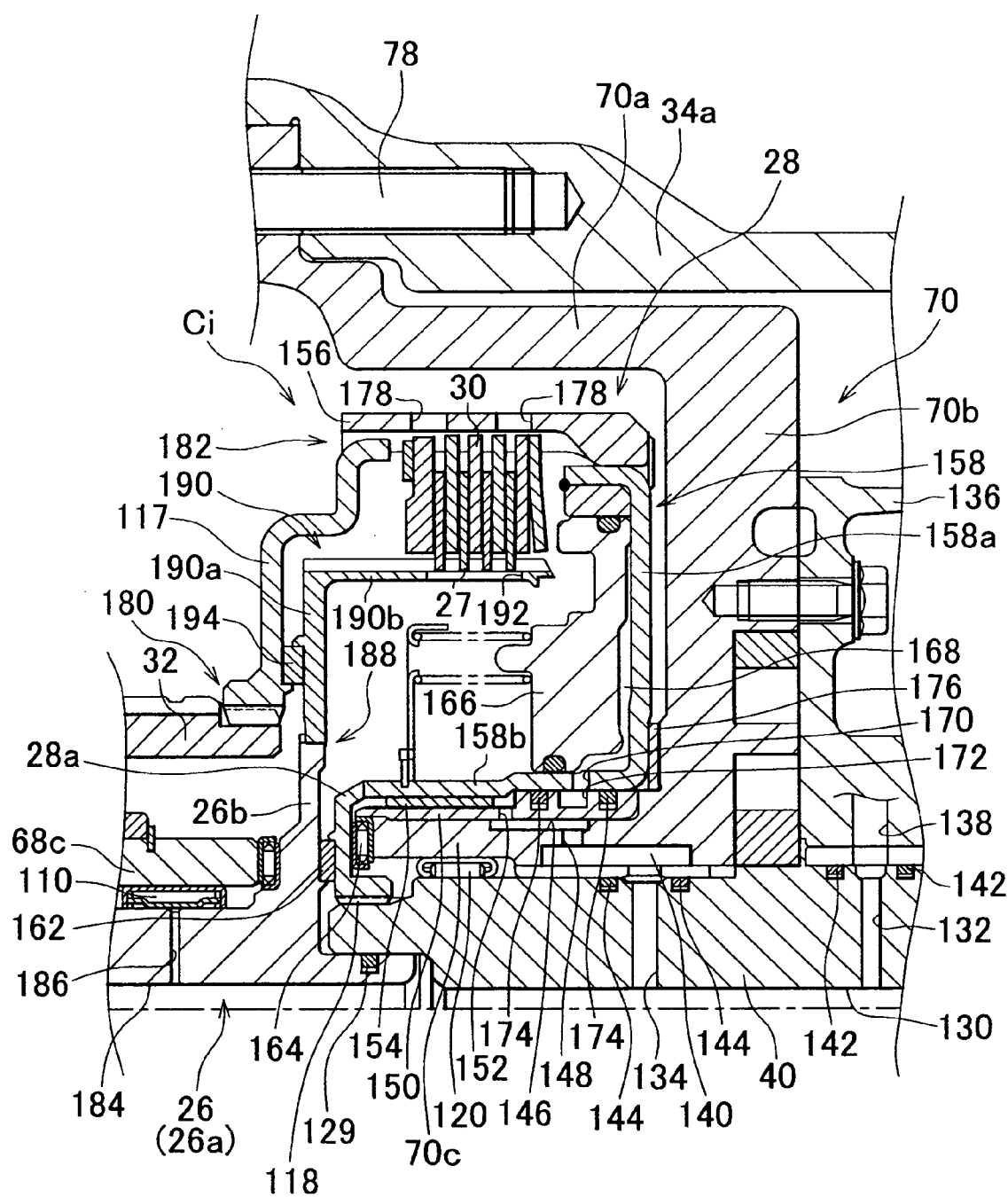
FIG. 6 is a cross-sectional diagram which shows a part of the driving apparatus shown in FIG. 1.

FIG. 6 is a cross-sectional view showing a part of the driving apparatus 10. Referring to FIG. 6, a seal ring 129 is fit to an end of the first input shaft 26 (i.e., extended portion 26a), and the second input shaft 40 is fit at one end onto that end of the first input shaft 26. The first input shaft 26 has a flange portion 26b adjacent to the portion onto which the second input shaft 40 is fit.

Inside the second input shaft 40 are formed an axial oil passage 130 that extends along the axis of the second input shaft 40, and two radial oil passages 132, 134. One opening of each of the radial oil passages 132, 134 is formed to the interior of the axial oil hole 130, and the other opening is formed on the outer surface of the second input shaft 40. The radial oil passage 132 is formed so as to face an oil passage 138 formed within a cover 136 of the oil pump 70. The other radial oil passage 134 is formed such that one opening thereof faces a first oil groove 140 which is formed on the inner surface of the shaft portion 70c of the oil pump 70 and which extends in the axial direction. Seal rings 142, 144 are fit to the outer surface of the second input shaft 40 along the axial direction so as to extend along both sides of the openings of the radial oil holes 132 and 134, respectively. The needle bearing 120 is arranged closer to the end of the shaft portion 70c of the oil pump 70 than the first oil groove 140.

A second oil groove 146 is formed on the outer surface of the shaft portion 70c of the oil pump 70 along the axial direction thereof. In the shaft portion 70c of the oil pump 70, a communicating hole 148 is formed in the radial direction which communicates with the communication portion 70b side end of the second oil groove 146 and the needle bearing 120 side end of the first oil groove 140.

An outer sleeve 150 is press-fitted to the outer surface of the shaft portion 70c of the oil pump 70. The direct clutch Ci is disposed on the outer surface of the shaft portion 70c of the oil pump 70 via the outer sleeve 150. A through hole 152 is formed in the outer sleeve 150 along the radial direction thereof such that the opening of the through hole 152 located on the side opposite the connection portion 70b faces the end of the second oil groove 146. Furthermore, a bush 154 is fit to the outer surface of the outer sleeve 150 on the opposite side of the connection portion 70b from the through hole 152. The clutch drum 28 is fit onto the outer surface of the bush 154.

The clutch drum 28 also serves as a clutch cylinder. The clutch drum 28 includes a cylindrical drum member 156 and a cylinder member 158 that is fixed by welding to the connection portion 70b side end of the drum member 156. The cylinder member 158 is a cylindrical member having a bottom 158a. The flange portion 28a is a portion of the cylinder member 158. Specifically, the flange portion 28a is fixed to the end of the opening of an inner-cylinder portion 158b of the cylinder member 158 such that it extends in the radially inner direction. Furthermore, the radially inner end of the flange portion 28a is formed in a cylindrical shape and is coupled by spline 118 to the second input shaft 40 so as not to allow relative rotation between the flange portion 28a and the second input shaft 40. A thrust washer 162 is provided between the flange portion 28a and the flange portion 26b of the first input shaft 26 and a thrust bearing 164 is provided between the flange portion 28a and the end face of the shaft portion 70c of the oil pump 70.

The cylinder member 158 houses a clutch piston 166. An oil chamber 168 is defined between the clutch piston 166 and the bottom 158a of the cylinder member 158. A through hole 170 is formed in the inner-cylinder portion 158b of the cylinder member 158 so as to pass through the inner-cylinder portion 158b into the oil chamber 168. An oil passage 172 is formed at the outer sleeve 150 to supply operating oil to the oil chamber 168 through the through hole 170. Seal rings 174 are fit in the both sides of the oil passage 172. A thrust washer 176 is provided between the radially inner end of the bottom 158a of the cylinder member 158 and the connection portion 70b of the oil pump 70.

Operating oil is supplied from an oil passage formed within the oil pump 70, not shown, to the oil passage 172. The operating oil is then supplied to the oil chamber 168 through the oil passage 172 and the through hole 170. Thus, the passage for distributing operating oil to the oil chamber 168 can be made short in length and simple in structure. That is, disposing the direct clutch Ci just behind the second electric motor-generator MG2 (i.e., near the oil pump 70) reduces the length of the oil passage up to the direct clutch Ci and simplifies its structure, as compared with a case in which the direct clutch Ci is arranged between the first electric motor-generator MG1 and the second electric motor-generator MG2. Furthermore, the seal rings 174 are provided to seal between the outer sleeve 150 and the cylinder member 158 both of which are non-rotatable members, which ensures supply of the operating oil with high reliability (sealing performance). Also, the seal rings 174 are disposed relatively to the inner radial side, thereby simplifying the structure (or reducing the diameter) of the seal rings 174.

The multiple friction discs 30 are fit to the inner surface of the drum member 156 so as not to allow relative rotation therebetween. An oil through hole 178 is formed in the drum member 156 so as to pass therethrough in the radial direction. The end of the inner surface of the aforementioned connection member 117 is fit by a spline 180 to the rotor shaft 32 of the aforementioned second electric motor-generator MG2. On the other hand, the end of the outer surface of the connection member 117 is fit to one end of the drum member 156 with a spline 182.

The first input shaft 26 has an axial oil hole 184 formed in the axial direction thereof in the same way as with the second input shaft 40. The first input shaft 26 has a radial oil hole 186 of which one opening is formed to the interior of the axial oil hole 184 and the other opening is formed on the outer surface of the first input shaft 26. A welded portion 188 is provided at the radially outer end of the flange portion 26b of the first input shaft 26. The welded portion 188 joins (connects) that end of the flange portion 26b of the first input shaft 26 and the radially inner end of a flange portion 190a of a clutch hub 190. The clutch hub 190 includes the flange portion 190a and a cylinder portion 190b which is connected to the end of the outer surface of the flange portion 190a and which extends toward the clutch piston 166, i.e., in the axial direction. Furthermore, the friction discs 27 are fit to the outer surface of the cylinder portion 190b by spline. Moreover, the cylinder portion 190b has an oil through hole 192 formed so as to pass therethrough in the radial direction. On the other hand, a thrust washer 194 is provided between the flange portion 190a and the connection member 117.

Next, a mounting procedure for mounting the components shown in FIG. 6 will be described. First, following mounting of the automatic transmission 14, which is not shown in FIG. 6, to the first case 34a, the oil pump 70 is fixed to the first case 34a with the bolts 78. Thus, the second input shaft 40 is supported by the oil pump 70. Next, the thrust washer 176 is fit to the shaft portion 70c of the oil pump 70. Then, the outer sleeve 150, to which the bush 154 and the seal rings 174 have been fit beforehand, is press-fitted to the shaft portion 70c. Subsequently, following mounting of the thrust bearing 164, a unit of the direct clutch Ci, which has been fabricated beforehand, is mounted to the first case 34a. Then, the thrust washer 162 is mounted, and the first input shaft 26 and the second input shaft 40 are fit to each other. Subsequently, the drum member 156 and the connection member 117 are fit to each other.

Next, a lubricating-oil flow path will be described with reference to FIG. 6. First, lubricating oil is supplied from the oil passage 138 provided within the cover 136 of the oil pump 70 to the axial oil hole 130 through the radial oil hole 132 of the second input shaft 40. Part of the lubricating oil supplied to the axial oil hole 130 is supplied to the axial oil hole 184 of the first input shaft 26. Then, the lubricating oil thus supplied to the axial oil hole 184 is supplied to the second electric motor-generator MG2 and the components provided for supporting the second electric motor-generator MG2 through the radial holes provided for the first input shaft 26, the shaft portion 68c of the second support wall 68, and the rotor shaft 32. For example, the lubricating oil is supplied to the bearing 110 through the radial oil hole 186.

Furthermore, another part of the lubricating oil supplied to the axial oil hole 130 of the second input shaft 40 is supplied to the bush 154 through the radial oil hole 134, the first oil groove 140, the communicating hole 148, the second oil groove 146, and the through hole 152, in that order, thereby lubricating the bush 154. The lubricating oil thus used for lubricating the bush 154 is also supplied to the friction discs 27 and 30 through a through hole, not shown, formed in the inner-cylinder portion 158b of the cylinder member 158 in the radial direction and the oil hole 192 formed in the clutch hub 190, in order to lubricate the friction discs 27 and 30. Moreover, the lubricating oil thus used for lubricating the friction discs 27 and 30 flows toward the upper-left area in FIG. 6 through the oil hole 178 formed in the drum member 156, in order to cool the stator of the second electric motor-generator MG2.

According to the embodiment as described above, the rotor 88 of the first electric motor-generator MG1 is not supported by the crankshaft 24 of the engine 12, but is supported by the first case 34a. Also, a drive connection between the transmitting member 22 connected to the crankshaft 24 of the engine 12 so as to rotate together therewith and the first electric motor-generator MG1 is established by fitting them to each other. This enables the rotor 88 of the first electric motor-generator MG1 to be connected to the engine 12 side after installing the rotor 88 into the first case 34a, which prevents foreign matter from adhering to the magnetized portion of the rotor 88. Furthermore, both the rotor 88 and the stator 98 are supported by the first case 34a, whereby the axes of the rotor 88 and the stator 98 can be aligned with high precision.

According to the embodiment, also, the first input shaft 26, which is a separate shaft from the rotor shaft 20 supporting the rotor 88, is supported by the case 34, not via the rotor shaft 20. Thus, the axis of the first input shaft 26 is aligned with high precision.

Also, the first chamber 84 housing the first electric motor-generator MG1 and the second chamber 86 housing the second electric motor-generator MG2 are kept airtight, which prevents the first and second electric motor-generators MG1 and MG2, which are electric components, from getting wet even if water enters the case 34.

Moreover, the transmitting member 22, which is a member provided on the engine 12 side, is connected to the rotor shaft 20 of the first electric motor-generator MG1, which is supported by the first case 34a, with the spline 94. This makes it easier to connect the transmitting member 22 and the rotor shaft 20 during assembly.

Also, according to the embodiment, the seal member 112 is provided between the shaft portion 68c of the second support wall 68 and the extended portion 26a of the first input shaft 26 to seal off the second chamber 86. This provides a better sealing performance than when a seal member is provided between the rotor shaft 20 and the first input shaft 26 which are both rotatable relative to the case 34, and prevents foreign matter from adhering to the bearings 114 and 116, through which the extended portion 26a is supported by the shaft portion 68c of the second support wall 68.

Also, one end of the rotor shaft 20 of the first electric motor-generator MG1 and both ends of the rotor shaft 32 of the second electric motor-generator MG2 are supported by the second support wall 68. This reduces the number of support walls and thus the axial length of the driving apparatus.

In the embodiment, the oil pump 70 also serves as the third support wall which further reduces the number of support walls and therefore results in a smaller length of the driving apparatus 10 in the axial direction.

Furthermore, the rotor shaft 32 of the second motor-generator MG2 is supported at two positions by the second support wall 68 alone, i.e., a single support wall. Thus, the axis of the rotor shaft 32 is aligned with improved precision. Also, the first input shaft 26 is supported by the second support wall 68 alone. Thus, the input shaft 40 is supported with improved precision, i.e., the axis of the input shaft 40 is aligned with improved precision.

Also, the first chamber 84 housing the first electric motor-generator MG1 is defined by the first support wall 66, the second support wall 68, and the rotor shaft 20 of the first motor-generator MG1 and is sealed off by the first seal member 104 and the second seal member 106, while the second chamber 86 housing the second motor-generator MG2 is sealed off, at the second support wall 68 side, by the third seal member 112. Thus, the first electric motor-generator MG1 and the second electric motor-generator MG2 are well sealed against water.

Also, the transmission 14 may be of various types of transmissions including a multi-speed planetary-gear transmission, belt-type continuously variable transmission, toroidal-type continuously variable transmission, and so forth.

While the electric motors have been used as "motor-generators" which also operate as a power generator in the foregoing embodiment, the electric motors may simply be used to produce rotational driving force from electric power. Furthermore, it is also possible to use one electric motor mainly as a generator and supply the generated power to the other electric motor through an electric path, thereby transmitting driving force to the wheels.

Also, in the foregoing embodiment, the support walls have been provided on the case to support the stator and rotor of the motor generator. That is, the support walls can be regarded as portions of the case. Also, such a support wall may either be formed integrally with the case or as a separate member from the case to be fixed to the case with bolts, an so on.

Also, in the foregoing embodiment, the chamber housing the motor generator is defied by the support walls. In addition to the support walls, a portion of the case may be used to define the chamber.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle driving apparatus comprising:
    a first electric motor;
    a second electric motor;
    a case that houses the first electric motor and the second electric motor;
    a first support wall that is supported by the case and rotatably supports the end of a rotor shaft of the first electric motor on the side opposite where the second electric motor is located;
    a second support wall which is arranged between the first electric motor and the second electric motor, is supported by the case, rotatably supports the end of the rotor shaft of the first electric motor on the side where the second electric motor is located, and rotatably supports at least one end of a rotor shaft of the second electric motor,
    wherein the rotor shaft of the second electric motor is supported at two positions by the second support wall and the two positions are located on a radially inner surface of the rotor shaft.

2. The vehicle driving apparatus according to claim 1, wherein
    a transmission portion is provided on the opposite side of the first electric motor from the second electric motor and along the same axis as the second electric motor, and
    a third support wall is provided between the transmission portion and the second electric motor.

3. The vehicle driving apparatus according to claim 2, wherein
    an oil pump is provided, and the third support wall is formed by the oil pump.

4. The vehicle driving apparatus according to claim 2, wherein
    the third support wall supports a transmission input shaft for inputting driving force to the transmission portion.

5. The vehicle driving apparatus according to claim 2, further comprising a clutch through which the first electric motor and an input shaft of the transmission portion are selectively connected to or disconnected from each other, wherein
    the clutch is arranged around the periphery of a portion of the third support wall which is formed along the axis of the case.

6. The vehicle driving apparatus according to claim 1, wherein
    an input shaft which is connected to the rotor shaft of the first electric motor so as to rotate together therewith and thus which is driven by driving force of the rotor of the first electric motor is supported by the second support wall alone.

7. The vehicle driving apparatus according to claim 6, wherein
    the input shaft is connected to a clutch, and the input shaft and the transmission portion are selectively connected to or disconnected from each other by the clutch.

8. The vehicle driving apparatus according to claim 6, wherein
the input shaft extends to the second support wall through a radially inner portion of the first support wall.

9. The vehicle driving apparatus according to claim 1, wherein
a first seal member is provided between the first support wall and the rotor shaft of the first electric motor at a position where the rotor shaft of the first electric motor is supported on the first support wall,
a second seal member is provided between the second support wall and the rotor shaft of the first electric motor at a position where the rotor shaft of the first electric motor is supported on the second support wall, and
a third seal member is provided between the second support wall and a shaft member provided along the axis of the case.

10. The vehicle driving apparatus according to claim 9, further comprising:
a driving-force transmission device; and
a clutch through which an input shaft of the driving-force transmission device and the first electric motor are selectively connected to or disconnected from each other, wherein
the clutch is arranged in a chamber in which the second electric motor is housed.

11. The vehicle driving apparatus according to claim 10, wherein
the clutch is arranged on the opposite side of the second electric motor from the first electric motor.

12. A vehicle driving apparatus, comprising:
an engine having a drive connection with a wheel of a vehicle;
a first electric motor having a drive connection with the wheel of the vehicle, which includes a stator, rotor, and rotor shaft supporting said rotor and is connected to the engine via a transmitting member that rotates together with an output shaft of the engine, the rotor shaft of the first electric motor and the output shaft of the engine being arranged along a predetermined axis, the rotor shaft of the first electric motor and the transmitting member being connected to each other by being fit to each other;
a case that houses the first electric motor, and
an input shaft for transmitting driving force of the engine and the first electric motor, the input shaft including a first shaft portion that extends through the inside of the rotor shaft of the first electric motor and a second portion that extends out from the inside of said rotor shaft on the side opposite where the engine is located,
further comprising a second electric motor which includes a stator, rotor, and rotor shaft supporting said rotor and being arranged along the predetermined axis,
wherein the case partially, or entirely, houses the second electric motor as well as the first electric motor,
the case includes a first support wall and second support wall,
the rotor shaft of the first electric motor is supported on the first support wall and the second support wall, and
the rotor shaft of the second electric motor is supported on the second support wall.

13. The vehicle driving apparatus according to claim 12, wherein
the input shaft is arranged along the predetermined axis and the second shaft portion of the input shaft being directly, or indirectly, supported by the case.

14. The vehicle driving apparatus according to claim 12, wherein the stator and the rotor of the first electric motor are housed in an airtight chamber defined in the case.

15. The vehicle driving apparatus according to claim 12, further comprising:
a transmission portion which is arranged on the opposite side of the second electric motor from the first electric motor and includes a transmission input shaft arranged along the predetermined axis; and
a third support wall that is provided between the transmission portion and the second electric motor.

16. The vehicle driving apparatus according to claim 15, further comprising an oil pump, a portion of the oil pump forming at least a portion of the third support wall.

17. The vehicle driving apparatus according to claim 15, further comprising:
a clutch through which the first electric motor and the transmission portion are selectively connected to or disconnected from each other, wherein
the clutch is arranged around the periphery of a portion of the third support wall which is formed along the predetermined axis.

18. The vehicle driving apparatus according to claim 12, wherein
the rotor shaft of the second electric motor is rotatably supported at two positions on the second support wall.

19. The vehicle driving apparatus according to claim 18, wherein
a portion of the second support wall extends through the inside of the rotor shaft of the second electric motor; and
the rotor shaft of the second electric motor is rotatably supported at two positions on that portion of the second support wall.

20. The vehicle driving apparatus according to claim 12, wherein
the input shaft is supported on the second support wall alone.

21. The vehicle driving apparatus according to claim 20, further comprising a clutch through which the input shaft and the transmission portion are selectively connected to or disconnected from each other.

22. The vehicle driving apparatus according to claim 12, further comprising:
a driving-force transmission device; and
a clutch through which an input shaft of the driving-force transmission device and the first electric motor are selectively connected to or disconnected from each other, wherein
the clutch is arranged in a chamber in which the second electric motor is housed.

23. The vehicle driving apparatus according to claim 22, wherein
the clutch is arranged on the opposite side of the second electric motor from the first electric motor.

* * * * *